United States Patent
Kaneko et al.

(10) Patent No.: US 10,014,535 B2
(45) Date of Patent: Jul. 3, 2018

(54) VEHICLE

(71) Applicant: TOYOTA JIDOSHA KABUSHIKI KAISHA, Toyota-shi, Aichi-ken (JP)

(72) Inventors: Tomohiko Kaneko, Okazaki (JP); Yohei Okamoto, Kasugai (JP); Kazuo Yamamoto, Toyota (JP); Tomohiro Ogawa, Toyota (JP); Masashi Toida, Nagoya (JP); Mitsuhiro Nada, Toyota (JP); Tomio Yamanaka, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 244 days.

(21) Appl. No.: 15/184,495

(22) Filed: Jun. 16, 2016

(65) Prior Publication Data

US 2016/0380287 A1 Dec. 29, 2016

(30) Foreign Application Priority Data

Jun. 26, 2015 (JP) ................................. 2015-129052

(51) Int. Cl.
*H01M 8/04* (2016.01)
*H01M 8/04223* (2016.01)
(Continued)

(52) U.S. Cl.
CPC ..... *H01M 8/04253* (2013.01); *B60L 11/1885* (2013.01); *B60L 11/1894* (2013.01); *H01M 8/0432* (2013.01); *H01M 8/04067* (2013.01); *H01M 8/0494* (2013.01); *H01M 8/04223* (2013.01); *H01M 8/04302* (2016.02);
(Continued)

(58) Field of Classification Search
CPC ....................................................... H01M 8/04
See application file for complete search history.

(56) References Cited

U.S. PATENT DOCUMENTS

2004/0106026 A1 6/2004 Fujita et al.
2007/0298289 A1* 12/2007 Clingerman ...... H01M 8/04223
429/429
2010/0167142 A1 7/2010 Saito

FOREIGN PATENT DOCUMENTS

JP 2004-172025 6/2004
JP 2006-147166 A 6/2006
(Continued)

*Primary Examiner* — Jacob Marks
(74) *Attorney, Agent, or Firm* — Finnegan, Henderson, Farabow, Garrett & Dunner LLP (57) ABSTRACT

An object is to provide a technique of reducing a potential failure to start a fuel cell system due to a temperature decrease in a vehicle with the fuel cell system mounted thereon. There is provided a vehicle that comprises a fuel cell system, a battery, a motor, and a determiner configured to determine that the fuel cell system has a frozen part when temperature measured by a temperature measurement unit is equal to or lower than a predetermined first temperature and at least one of conditions (1) to (3) is satisfied: (1) no purging process is performed after a change from an on state of the vehicle to an off state of the vehicle; (2) ambient temperature decreases to or below a predetermined second temperature in the off state of the vehicle and no purging process is performed; and (3) an inclination of the vehicle is equal to or greater than a predetermined inclination at a time of change from the off state of the vehicle to the on state of the vehicle.

5 Claims, 4 Drawing Sheets (51) Int. Cl.
- *H01M 16/00* (2006.01)
- *H01M 8/04302* (2016.01)
- *H01M 8/0432* (2016.01)
- *H01M 8/04007* (2016.01)
- *H01M 8/04858* (2016.01)
- *B60L 11/18* (2006.01)
- *H01M 8/04828* (2016.01)
- *H01M 8/1018* (2016.01)

(52) U.S. Cl.
CPC ..... *H01M 8/04932* (2013.01); *H01M 16/006* (2013.01); *H01M 2008/1095* (2013.01); *H01M 2220/20* (2013.01); *H01M 2250/20* (2013.01); *H01M 2250/402* (2013.01); *Y02B 90/12* (2013.01); *Y02T 90/32* (2013.01); *Y02T 90/34* (2013.01)

(56) References Cited

FOREIGN PATENT DOCUMENTS

| | | |
|---|---|---|
| JP | 2008-010424 A | 1/2008 |
| JP | 2008-312418 | 12/2008 |
| JP | 4379922 | 10/2009 |

\* cited by examiner

VEHICLE

CROSS-REFERENCE TO RELATED APPLICATIONS

The present application claims priority from Japanese patent applications P2015-129052 filed on Jun. 26, 2015, the content of which is hereby incorporated by reference into this application.

TECHNICAL FIELD

The present invention relates to a vehicle.

DESCRIPTION OF RELATED ART

In a state that a fuel cell system mounted on a vehicle is suspended, the vehicle may be driven by driving a motor with electric power supplied from a battery. In the event of a failure to start the fuel cell system during such driving of the vehicle, there may be a shortage of electric power supplied to the motor, due to reduction in state of charge of the battery.

In order to handle this problem, for example, a technique disclosed in JP 4379922B determines that a fuel cell system is likely to fail to start and does not make the vehicle ready for driving without allowing for supply of electric power from a battery to motor, when a vehicle with the fuel cell system mounted thereon is at stop for a long time period.

The technique disclosed in JP 4379922B, however, does not take into account the possibility of a failure to start the fuel cell system due to the presence of any frozen part in the fuel cell system. Irrespective of the possibility of a failure to start the fuel cell system, this prior art vehicle may allow electric power to be supplied from the battery to the motor and may lead to a shortage of electric power supplied to the motor due to reduction in state of charge of the battery during driving of the vehicle.

SUMMARY

In order to solve at least part of the problems described above, the invention may be implemented by the following aspects or configurations.

According to one aspect of the invention, there is provided a vehicle. The vehicle comprises a fuel cell system that has a fuel cell and a gas flow path arranged to supply a reactive gas to the fuel cell and is configured to allow the fuel cell to generate electric power by controlling supply of the reactive gas to the fuel cell; a battery that is configured to store electric power; a motor that is operated by receiving supply of electric power from at least one of the fuel cell and the battery; a temperature measurement unit that is configured to measure temperature in the fuel cell system; and a controller that includes a determiner configured to determine that the fuel cell system has a frozen part when the temperature measured by the temperature measurement unit is equal to or lower than a predetermined first temperature and at least one of conditions (1) to (3) is satisfied at a time of change from an off state of the vehicle in which power supply of the vehicle is off to an on state of the vehicle in which power supply of the vehicle is on, and a power controller configured to control an amount of electric power that is to be supplied to the motor: (1) a purging process of supplying a purge gas to the gas flow path is not performed after the change from the on state of the vehicle to the off state of the vehicle; (2) the temperature measured by the temperature measurement unit decreases to or below a predetermined second temperature in the off state of the vehicle and the purging process of supplying the purge gas to the gas flow path is not performed; and (3) an inclination of the vehicle is equal to or greater than a predetermined inclination at the time of change from the off state of the vehicle to the on state of the vehicle. When the determiner determines that the fuel cell system has no frozen part, the power controller allows electric power to be supplied from at least one of the fuel cell and the battery to the motor. The vehicle of this aspect determines whether the fuel cell system has any frozen part, determines that a start of the fuel cell system is allowable when the fuel cell system has no frozen part, and allows electric power to be supplied from at least one of the fuel cell and the battery to the motor, so as to shift the state of the vehicle to a ready state in which vehicle is ready for driving. This configuration does not allow for a shift of the state of the vehicle to the ready state when the fuel cell system has a frozen part and is likely to fail to start. This accordingly prevents a shortage of electric power supplied from the battery to the motor during driving of the vehicle.

In the vehicle of the above aspect, when the temperature measured by the temperature measurement unit is higher than a predetermined third temperature that is lower than the predetermined first temperature at the time of change from the off state of the vehicle to the on state of the vehicle, the determiner may determine whether at least one of the conditions (1) to (3) is satisfied. When the temperature measured by the temperature measurement unit is equal to or lower than the predetermined third temperature at the time of change from the off state of the vehicle to the on state of the vehicle, the determiner may determine that the fuel cell system has a frozen part without determining whether any one of the conditions (1) to (3) is satisfied. When the ambient temperature is equal to or lower than a certain temperature, the vehicle of this aspect determines that the fuel cell system has a frozen part without determining whether any one of the conditions (1) to (3) is satisfied. This configuration more effectively prevents a failure to start the fuel cell system.

In the vehicle of the above aspect, when at least one of conditions (4) to (6) is satisfied after determination that the fuel cell system has a frozen part, the determiner may determine that the frozen part of the fuel cell system is not unfreezable: (4) electric power is supplied from the battery to an auxiliary machine provided to start the fuel cell system, and a suppliable electric power stored in the battery is reduced; (5) a state that a current value of electric power generated by the fuel cell is equal to or lower than a predetermined first current value continues for a predetermined time period or a longer time period; and (6) the current value of electric power generated by the fuel cell is equal to or lower than a predetermined second current value or when a voltage value of electric power generated by the fuel cell is equal to or lower than a predetermined first voltage value. When the determiner determines that the frozen part is not unfreezable, the power controller may not allow electric power to be supplied from the battery to the motor. The vehicle of this aspect does not allow electric power to be supplied from the battery to the motor when the frozen part of the fuel cell system is not unfreezable. This configuration does not allow for a shift of the state of the vehicle to the ready state in which the vehicle is ready for driving and thereby prevents a shortage of electric power supplied from the battery to the motor during driving of the vehicle.

In the vehicle of the above aspect, when the determiner determines that the frozen part is unfreezable, the power controller may perform an unfreezing process that unfreezes the frozen part of the fuel cell system by at least one of operation of the auxiliary machine provided to start the fuel cell system with electric power supplied from the battery and power generation of the fuel cell. When it is determined that the frozen part of the fuel cell system is unfreezable, the vehicle of this aspect performs the unfreezing process by at least one of the operation of the auxiliary machine and the power generation of the fuel cell. This accordingly ensures a quick start of the fuel cell system.

In the vehicle of the above aspect, when the power controller performs the unfreezing process and all of conditions (7) to (9) are satisfied, the determiner may determine that the fuel cell system has no frozen part and is in an unfrozen state: (7) a cumulative current value of electric power generated by the fuel cell is equal to or greater than a predetermined cumulative value; (8) an exhaust amount in the fuel cell system is equal to or greater than a predetermined exhaust amount; and (9) the current value of electric power generated by the fuel cell is equal to or higher than a predetermined third current value or the voltage value of electric power generated by the fuel cell is equal to or higher than a predetermined second voltage value. When the determiner determines that the fuel cell system is in the unfrozen state, the power controller may allow electric power to be supplied from at least one of the fuel cell and the battery to the motor. The vehicle of this aspect allows for a shift of the state of the vehicle to the ready state in which the motor is drivable and the vehicle is ready for driving, after the frozen part of the fuel cell system is unfrozen. This configuration prevents a failure to start the fuel cell system and a resulting shortage of electric power supplied from the battery to the motor during driving of the vehicle.

The invention may be implemented by various aspects, for example, a fuel cell system, a vehicle with the fuel cell system mounted thereon, a control method of the fuel cell system, a computer program that is configured to implement the control method of the fuel cell system and a non-transitory storage medium in which the computer program is stored.

DESCRIPTION OF EMBODIMENTS

A. Embodiment

A-1. Configuration of Fuel Cell System

Figure 1:
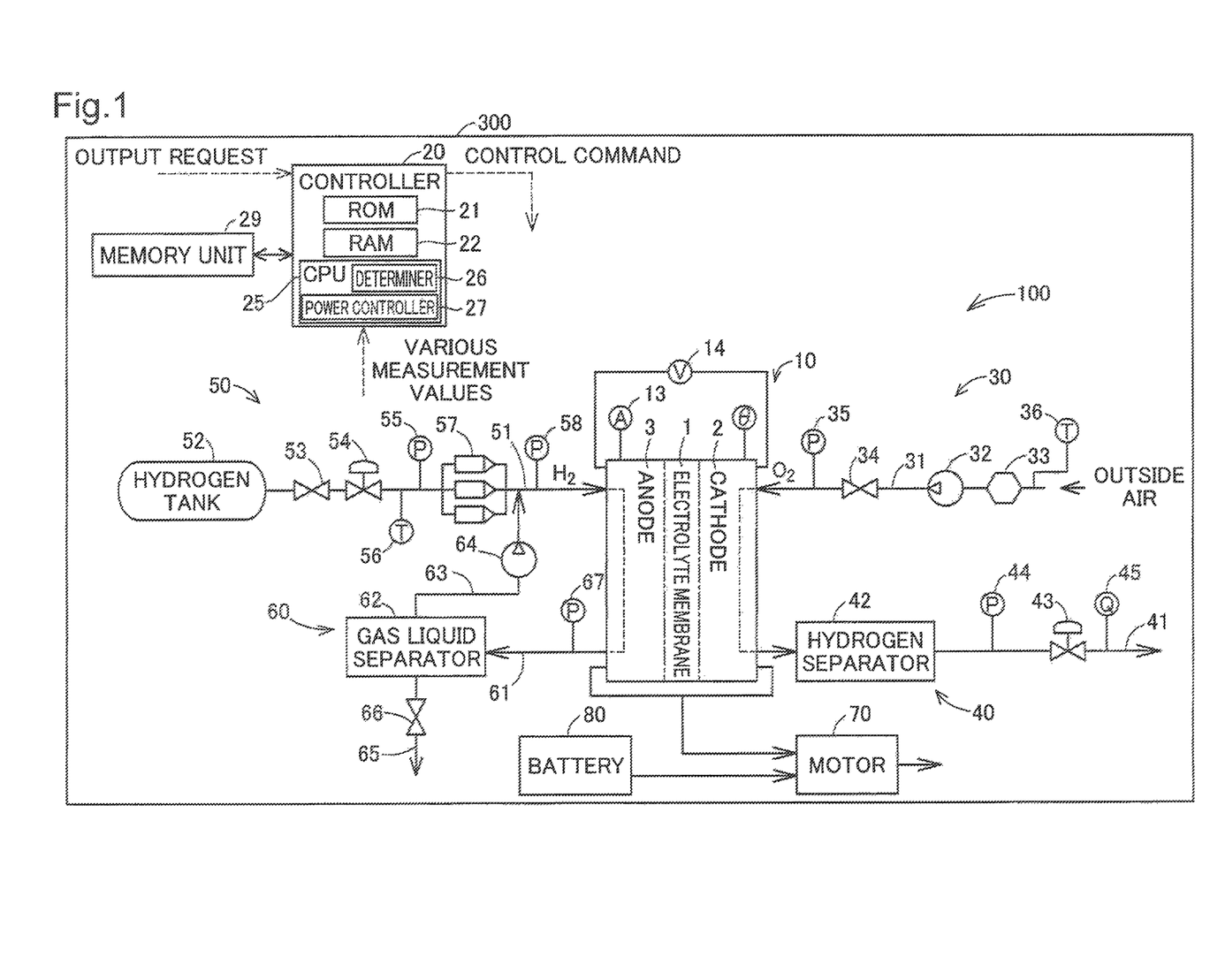
FIG. 1 is a schematic diagram illustrating the configuration of a fuel cell system mounted on a vehicle according to an embodiment.

FIG. 1 is a schematic diagram illustrating the configuration of a fuel cell system 100 mounted on a vehicle 300 according to an embodiment. The fuel cell system 100 mounted on the vehicle 300 is configured to supply electric power to, for example, a motor 70 for driving the vehicle 300 and electric equipment.

The vehicle 300 has various states: an OFF state in which an ignition switch of the vehicle 300 is OFF; an ON state in which the ignition switch of the vehicle 300 is ON; a checking state in which various checks are made to determine whether the vehicle 300 is made ready for driving by changing the state from the OFF state to the ON state; a ready-on state (ready state) in which the motor 70 is driven by supply of electric power from at least one of a battery 80 and a fuel cell 10 to make the vehicle 300 ready for driving; a system start state in which the fuel cell system 100 is started to make the vehicle 300 ready for driving with electric power generated by the fuel cell 10; and a driving state in which the vehicle 300 is driven with electric power generated by the fuel cell 10 or electric power supplied from the battery 80. The ON state, the system start state and the driving state include a warm-up state for increasing the internal temperature of the fuel cell system 100. In the warm-up state, the internal temperature of the fuel cell system 100 is increased, and the fuel cell 10 is operated to generate electric power. The vehicle 300 may be in the warm-up state both when the vehicle 300 is at stop and when the vehicle 300 is moving.

The fuel cell system 100 includes a fuel cell 10, a motor 70, a battery 80, a controller 20, a memory unit 29, a cathode gas supply system 30, a cathode off-gas discharge system 40, an anode gas supply system 50 and an anode gas circulation system 60. The fuel cell 10 is a polymer electrolyte fuel cell that is configured to generate electric power with receiving supplies of hydrogen as an anode gas that is one reactive gas and oxygen as a cathode gas that is the other reactive gas. The fuel cell 10 has a plurality of power generation elements that are stacked and arrayed in series and are also called unit cells. Each unit cell has a membrane electrode assembly (MEA) that includes an electrolyte membrane 1, a cathode 2 that is placed on one surface of the electrolyte membrane 1 and an anode 3 that is placed on the other surface of the electrolyte membrane 1. Only one unit cell is shown as the fuel cell 10 in FIG. 1. The electrolyte membrane 1 is a solid polymer electrolyte membrane having good proton conductivity in the wet state and is made of, for example, a fluorine-based ion exchange resin. The cathode 2 and the anode 3 are catalyst electrode layers having gas diffusibility and electrical conductivity, and each includes a catalyst metal that accelerates electrochemical reaction and a polymer electrolyte that has proton conductivity. The catalyst electrode layer is formed as a dry coating film of a catalyst ink in which platinum-supported carbon and a polymer electrolyte that is identical with or analogous to that of the electrolyte membrane 1 are dispersed in a solvent. Gas flow paths are provided on the respective sides of the MEA. The gas flow paths may be formed by, for example, grooves provided on separators or by expanded metal. According to this embodiment, the gas flow path on the cathode side is also called cathode gas flow path, and the gas flow path on the anode side is also called anode gas flow path. A current detector 13, a voltage detector 14 and an inclination detector 15 are mounted to the fuel cell 10. The current detector 13 detects a current value of electric power generated by the fuel cell 10 and sends the detected current value to the controller 20. The voltage detector 14 detects a voltage of electric power generated by the fuel cell 10 and sends the detected voltage to the controller 20. The inclination detector 15 is provided as an acceleration sensor to detect an inclination of the fuel cell 10 by detecting the direction of gravitational acceleration and send the detected inclination to the controller 20.

The motor 70 is driven with electric power generated by the fuel cell 10 and with electric power supplied from the battery 80. The vehicle 300 is driven with power generated by the driving motor 70. The battery 80 is a secondary battery that is configured to supply electric power for driving the motor 70 and temporarily accumulate electric power generated by the fuel cell 10.

The controller 20 is configured by a computer that includes a CPU 25, a ROM 21, a RAM 22 and input and output interfaces (not shown) to control the respective components of the fuel cell system 100. For example, the controller 20 externally receives an output request, such as an operation of an accelerator pedal, obtains detection values based on output signals from various sensors in the system and sends a control command to make the fuel cell 10 generate electric power that meets the output request, to the respective components in the system.

The CPU 25 loads respective computer programs stored in the ROM 21 onto the RAM 22 to execute the respective computer programs. The CPU 25 includes a determiner 26 that is configured to make various determinations with regard to freezing of the fuel cell system 100 and a power controller 27 that is configured to control driving of the motor 70 based on the results of the determinations. The determiner 26 performs freezing determination, unfreezable determination and unfreezing completion determination with regard to the fuel cell system 100, based on various threshold values stored in the memory unit 29 and various measurement values detected by, for example, the current detector 13. The details of the freezing determination, the unfreezable determination and the unfreezing completion determination will be described later, along with description of the various threshold values stored in the memory unit 29.

The power controller 27 controls the driving state of the motor 70 and controls the electric power that is to be supplied to auxiliary machinery including various valves operated for air intake and exhaust in the fuel cell system 100. The auxiliary machinery to which the electric power is to be supplied include an air compressor 32 and injectors of a hydrogen supply device 57 for supplying hydrogen, in addition to various valves. The power controller 27 controls the supply of electric power that is generated by the fuel cell 10 in response to the output request received by the controller 20, to the motor 70 in the driving state. The power controller 27 also controls the supply of electric power to various valves in an unfreezing process described later to operate the respective valves and thereby unfreeze a frozen valve.

The cathode gas supply system 30 is configured to supply the oxygen-containing high-pressure air to the cathode 2 of the fuel cell 10. The cathode gas supply system 30 includes a cathode gas pipe 31, an air compressor 32, an air flowmeter 33, a supply valve 34, a pressure detector 35 and an ambient temperature detector 36. The cathode gas pipe 31 has one end that is open to outside of the fuel cell system 100 via an air filter (not shown) and the other end that is connected with an inlet of the cathode gas flow path of the fuel cell 10 via the air flowmeter 33, the air compressor 32, the supply valve 34 and the pressure detector 35. The air compressor 32 takes in and compresses the outside air and supplies the compressed air as the high-pressure air to the cathode 2 of the fuel cell 10 through the cathode gas pipe 31 and the cathode gas flow path. The air flowmeter 33 detects the amount of the outside air taken in by the air compressor 32 and sends the detected amount to the controller 20. The controller 20 drives the air compressor 32 based on the detection value detected by the air flowmeter 33, so as to control the supply amount of the air to the cathode 2. The supply valve 34 is opened and closed in response to the pressure of the cathode gas that is supplied to the cathode 2, so as to control the inflow of the high-pressure air to the cathode 2. The supply valve 34 is configured to be normally closed and to be opened by supply of the high-pressure air having a predetermined or higher pressure from the air compressor 32. The pressure detector 35 detects the pressure of the cathode gas and sends the detected pressure to the controller 20. The ambient temperature detector 36 detects the temperature of the outside air of the vehicle 300 (ambient temperature To) and sends the detected temperature to the controller 20.

The cathode off-gas discharge system 40 is configured to discharge an exhaust gas including unreacted gases that are not used for the power generation reaction at the cathode 2 and produced water (hereinafter also called "cathode off-gas"). The cathode off-gas discharge system 40 includes a cathode off-gas pipe 41, a hydrogen separator 42, an exhaust valve 43, a pressure detector 44 and a flow rate detector 45. The cathode off-gas pipe 41 has one end that is connected with an outlet of the cathode gas flow path of the fuel cell 10 and the other end that is open to outside of the fuel cell system 100 via the hydrogen separator 42, the pressure detector 44 and the exhaust valve 43. The hydrogen separator 42 separates cross-leaked hydrogen from the cathode off-gas. The exhaust valve 43 regulates the pressure of the cathode off-gas (i.e., the back pressure on the cathode 2-side of the fuel cell 10) in the cathode off-gas pipe 41. The exhaust valve 43 has the opening position regulated by the controller 20. The pressure detector 44 detects the pressure of the cathode off-gas and sends the detected pressure to the controller 20. The flow rate controller 45 detects the flow rate of the cathode off-gas and sends the detected flow rate to the controller 20.

The anode gas supply system 50 includes an anode gas pipe 51, a hydrogen tank 52, an on-off valve 53, a regulator 54, a primary pressure detector 55, a temperature detector 56, a hydrogen supply device 57 and a secondary pressure detector 58. The anode gas pipe 51 has one end that is connected with the hydrogen tank 52 and the other end that is connected with an inlet of the anode gas flow path of the fuel cell 10 via the on-off valve 53, the regulator 54, the primary pressure detector 55, the temperature detector 56, the hydrogen supply device 57 and the secondary pressure detector 58. The hydrogen tank 52 supplies the high-pressure hydrogen stored in the hydrogen tank 52 to the anode 3 of the fuel cell 10 through the anode gas pipe 51 and the anode gas flow path. The on-off valve 53 is opened and closed in response to a command from the controller 20 to control the inflow of hydrogen from the hydrogen tank 52 to the upstream side of the hydrogen supply device 57. The regulator 54 is a pressure reducing valve configured to regulate the pressure of hydrogen on the upstream side of the hydrogen supply device 57 and has the opening position regulated by the controller 20.

The primary pressure detector 55 detects the internal pressure of the anode gas pipe 51 on the upstream side of the hydrogen supply device 57 and sends the detected pressure to the controller 20. The temperature detector 56 detects the internal temperature of the anode gas pipe 451 on the upstream side of the hydrogen supply device 57 and sends the detected temperature to the controller 20. The secondary pressure detector 58 detects the internal pressure of the anode gas pipe 51 on the downstream side of the hydrogen supply device 57 and sends the detected pressure to the controller 20.

The hydrogen supply device 57 is configured by, for example, a plurality of injectors that are electromagnetically-driven on-off valves. The hydrogen supply device 57 of this embodiment includes three injectors. The number of the injectors included in the hydrogen supply device 57 may be one or two or may be four or more. A control signal output from the controller 20 controls the number of injectors that are to be operated to inject hydrogen gas toward the downstream side of the anode gas pipe 51 and the injection (supply) time and the injection (supply) timing of hydrogen gas by the injectors in the hydrogen supply device 57.

The anode gas circulation system 60 is configured to circulate an anode off-gas including unreacted gases (for example, hydrogen and nitrogen) that are not used for the power generation reaction at the anode 3, to the anode 3 of the fuel cell 10. The anode gas circulation system 60 includes an anode off-gas pipe 61, a gas liquid separator 62, an anode gas circulation pipe 63, a circulation pump 64, an anode drainage pipe 65, a drainage valve 66 and a pressure detector 67.

The anode off-gas pipe 61 is arranged to connect the outlet of the cathode gas flow path of the fuel cell 10 with the gas liquid separator 62 and guide the anode off-gas discharged from the fuel cell 10 to the gas liquid separator 62. The pressure detector 67 detects the pressure of the anode off-gas in the neighborhood of the outlet of the fuel cell 10 and sends the detected pressure to the controller 20. The controller 20 controls the amount of hydrogen that is to be supplied from the hydrogen supply device 57 to the fuel cell 10, based on the detection value detected by the pressure detector 67. The gas liquid separator 62 separates a gas component included in the anode-off gas guided from the anode off-gas pipe 61 from water and guides the gas component to the anode gas circulation pipe 63 while guiding the water to the anode drainage pipe 65. The anode gas circulation pipe 63 is connected with the anode gas pipe 51 on the downstream side of the hydrogen supply device 57. The circulation pump 64 is provided in the anode gas circulation pipe 63. Hydrogen included in the gas component separated by the gas liquid separator 62 is fed to the anode gas pipe 51 by the driving force of the circulation pump 64. The anode drainage pipe 65 is configured to discharge water (drainage water) separated by the gas liquid separator 62 and an inert gas included in the anode off-gas, out of the fuel cell system 100. The drainage valve 66 is provided in the anode drainage pipe 65 and is opened and closed in response to a command from the controller 20.

The fuel cell system 100 mounted on the fuel cell vehicle 300 further includes a DC-DC converter that is configured to control the output voltage of the fuel cell 10 and control charging and discharging of the battery 80, although illustration and detailed description thereof are omitted.

Figure 2:
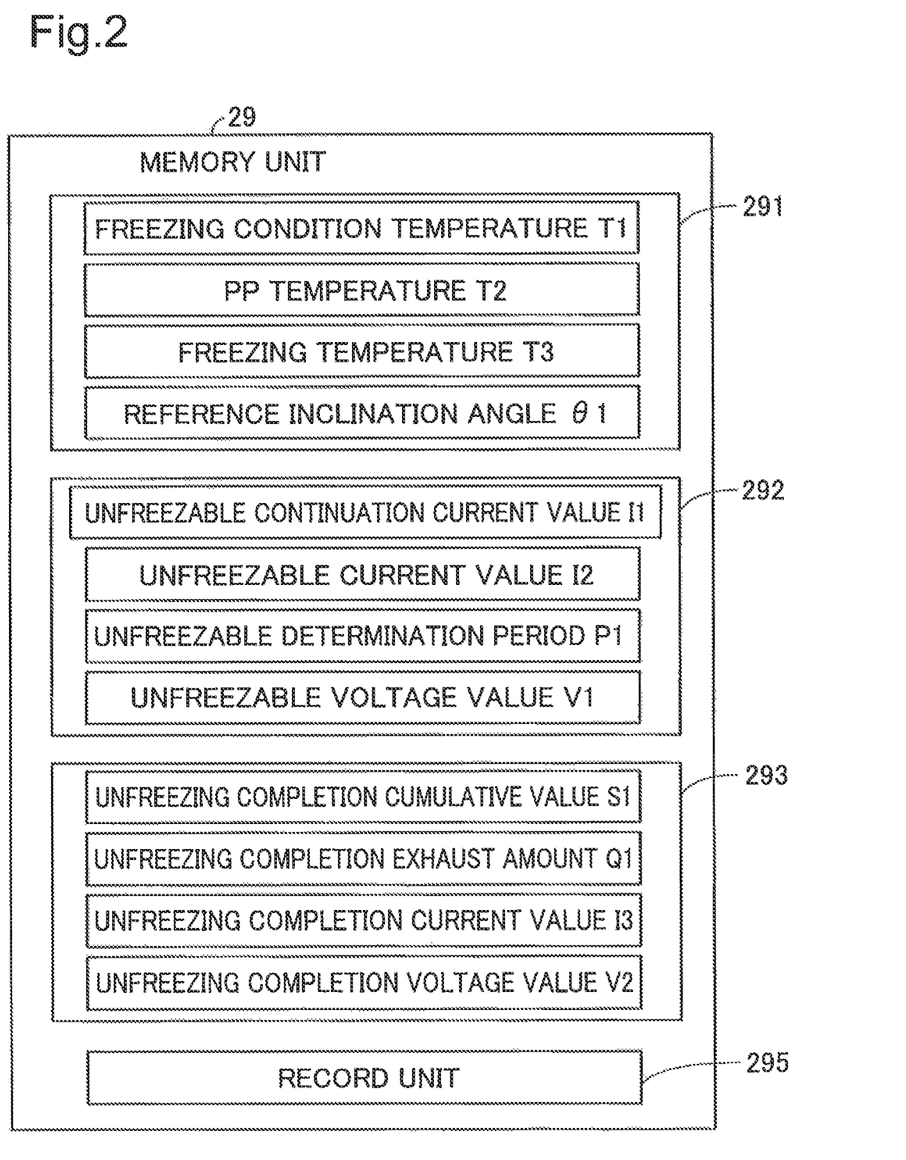
FIG. 2 is a diagram illustrating various threshold values stored in a memory unit.

FIG. 2 is a diagram illustrating various threshold values stored in the memory unit 29. The stored threshold values shown in FIG. 2 are used for various determinations made by the determiner 26. The memory unit 29 has freezing determination threshold values 291 used for the freezing determination, unfreezable determination threshold values 292 used for the unfreezable determination, unfreezing completion determination threshold values 293 used for the unfreezing completion determination, and a record unit 295. The record unit 295 stores records of a purging process performed after the state of the vehicle 300 is changed from the ON state to the OFF state and a parking purge process (PP process) performed in the OFF state of the vehicle 300. The purging process includes a process of purging out water from the fuel cell 10 with supplying the air on the cathode side and a process of purging out unreacted hydrogen and water from the fuel cell 10 with circulating hydrogen on the anode side. The PP process means a purging process performed when the internal temperature of the fuel cell system 100 decreases to or below a predetermined temperature in the OFF state of the vehicle 300. According to this embodiment, the temperature measured by the temperature detector 56 is used as the internal temperature of the fuel cell system 100. According to a modification, a detection value of a thermometer placed at a different location from the temperature detector 56 in the fuel cell system 100 (for example, ambient temperature To) may be used as the internal temperature of the fuel cell system 100. The temperature detector 56 corresponds to the temperature measurement unit in the claims.

The determiner 26 performs the freezing determination to determine whether the fuel cell system 100 has a frozen part using the freezing determination threshold values 291 and various measurement values. When it is determined that the fuel cell system 100 has a frozen part, the determiner 26 performs the unfreezable determination to determine whether the frozen part of the fuel cell system 100 is unfreezable using the unfreezable determination threshold values 292 and various measurement values. When it is determined that the frozen part of the fuel cell system 100 is unfreezable, the determiner 26 performs the unfreezing completion determination to determine whether the frozen part is unfrozen as a result of the unfreezing process using the unfreezing completion determination threshold values 293 and various measurement values. The details of the freezing determination, the unfreezable determination and the unfreezing completion determination are described below, along with the threshold values used for the respective determinations.

The freezing determination threshold values 291 include a freezing condition temperature T1, a parking purge temperature T2 (PP temperature T2), a freezing temperature T3 (<T1) that is a threshold value of temperature lower than the freezing condition temperature T1 and a reference inclination angle $\theta 1$, as the threshold values used for the freezing determination. The determiner 26 determines that the fuel cell system 100 has a frozen part when any of the following conditions (A) to (D) is satisfied:

(A) There is no record of the purging process after the state of the vehicle 300 is changed from the ON state to the OFF state, and a detection value TT of the temperature detector 56 when the state of the vehicle 300 is changed from the OFF state to the ON state is equal to or lower than the freezing condition temperature T1;

(B) The detection value TT of the temperature detector 56 when the state of the vehicle 300 is changed from the OFF state to the ON state is equal to or lower than the freezing condition temperature T1, and there is no execution record of the PP process that is to be performed despite a decrease in the internal temperature of the fuel cell system 100 to or below the PP temperature T2 in the OFF state of the vehicle 300;

(C) The detection value TT of the temperature detector 56 when the state of the vehicle 300 is changed from the OFF state to the ON state is equal to or lower than the freezing condition temperature T1, and the inclination of the vehicle 300 is equal to or greater than the reference inclination angle $\theta 1$; and (D) The detection value TT of the temperature detector 56 when the state of the vehicle 300 is changed from the OFF state to the ON state is equal to or lower than the freezing temperature T3 (<T1).

When the condition (A) is satisfied, no purging process is performed, so that the unreacted gas and water produced by the reaction are likely to remain in the fuel cell 10 and the gas flow paths. Even when the ambient temperature To is equal to or lower than the freezing condition temperature T1, the frozen part may be unfrozen by driving the auxiliary machinery with electric power supplied from the battery 80. When the condition (A) is satisfied, however, water accumulated in the fuel cell system 100 is frozen to enhance the degree of freezing. This may result in a failure to open and close the various valves in response to control commands and thereby leads to a failure to normally start the fuel cell system 100 from the ON state to the system start state. When the condition (A) is satisfied, the determiner 26 accordingly determines that the fuel cell system 100 has a frozen par and performs the unfreezable determination described later.

The PP process in the condition (B) is a process of purging out the unreacted gas and water from the fuel cell system 100 in order to prevent any part of the fuel cell system 100 from being frozen when the detection value TT of the temperature detector 56 decreases to or below the PP temperature T2 in the OFF state of the vehicle 300. When the condition (B) is satisfied, the PP process has not been performed. As in the case of the condition (A), this may lead to a failure to normally start the fuel cell system 100 from the ON state to the system start state. When the condition (B) is satisfied, the determiner 26 accordingly determines that the fuel cell system 100 has a frozen part and performs the unfreezable determination.

When the condition (C) is satisfied, even when a small amount of water is present in the fuel cell system 100, inclination of the vehicle 300 makes water more likely to be localized and frozen in part of the fuel cell 10. This may lead to a failure to normally start the fuel cell system 100 from the ON state to the system start state, irrespective of the presence or the absence of the purging process and the PP process. When the condition (C) is satisfied, the determiner 26 accordingly determines that the fuel cell system 100 has a frozen part and performs the unfreezable determination.

When the condition (D) is satisfied, since the detection value TT of the temperature detector 56 indicates an extremely low temperature that is equal to or lower than the freezing temperature T3 (<freezing condition temperature T1), the determiner 26 determines that the fuel cell system 100 has a frozen part, irrespective of the presence or the absence of a record of the PP process and performs the unfreezable determination. The freezing condition temperature T1 corresponds to the first temperature in the claims. The PP temperature T2 corresponds to the second temperature in the claims. The reference inclination angle θ1 corresponds to the predetermined inclination in the claims. The freezing temperature T3 corresponds to the third temperature in the claims. The conditions (A) to (C) respectively correspond to the conditions (1) to (3) in the claims.

The unfreezable determination thresholds 292 include an unfreezable continuation current value I1, an unfreezable current value I2, an unfreezable determination period P1, and an unfreezable voltage value V1, as the threshold values used for the unfreezable determination. When the result of the freezing determination indicates that the fuel cell system 100 has a frozen part, the determiner 26 performs the unfreezable determination to determine whether the frozen part of the fuel cell system 100 is unfreezable. The determiner 26 determines that the frozen part of the fuel cell system 100 is not unfreezable when any of the following conditions (E) to (G) is satisfied. All the conditions (E) to (G) are on the premise that the fuel cell system 100 is in the ON state.

(E) The power controller 27 supplies electric power from the battery 80 to drive the auxiliary machinery in the fuel cell system 100, and the electric power supplied from the battery 80 to the auxiliary machinery decreases:

(F) The power controller 27 causes the fuel cell 10 to perform power generation, and the state that the current value of electric power generated by the fuel cell 10 is equal to or lower than the unfreezable continuation current value I1 continues for the unfreezable determination period P1 or longer; and (G) The power controller 27 causes the fuel cell 10 to perform power generation, and the current value of electric power generated by the fuel cell 10 is equal to or lower than the unfreezable current value I2 or the voltage value of electric power generated by the fuel cell 10 is equal to or lower than the unfreezable voltage value V1.

With regard to the condition (E), the battery 80 is required to store a certain amount of electric power required to start the fuel cell system 100. Continuously supplying electric power from the battery 80 to the auxiliary machinery decreases the state of charge of the battery 80. The determiner 26 accordingly determines that the suppliable amount of electric power from the battery 80 is reduced. When the condition (E) is satisfied, the determiner 26 accordingly determines that the frozen part of the fuel cell system 100 is not unfreezable.

With regard to the condition (F), when the current value of the fuel cell 10 is equal to or lower than the unfreezable continuation current value I1 after elapse of a time period of not shorter than the unfreezable determination period P1 since a start of power generation by the fuel cell 10, it is determined that the unfreezing process for unfreezing the frozen part is not executable. When the condition (F) is satisfied, the determiner 26 accordingly determines that the frozen part of the fuel cell system 100 is not unfreezable.

Satisfaction of the condition (G) means that a sufficient current value or a sufficient voltage value is not obtained by power generation by the fuel cell 10. In this case, like the condition (F), continuing power generation by the fuel cell 10 does not allow the unfreezing process for unfreezing the frozen part to be executed. When the condition (G) is satisfied, the determiner 26 accordingly determines that the frozen part of the fuel cell system 100 is not unfreezable. The unfreezable continuation current value I1 and the unfreezable current value I2 respectively correspond to the first current value and the second current value in the claims. The unfreezable determination period P1 corresponds to the predetermined time period in the claims. The unfreezable voltage value V1 corresponds to the first voltage value in the claims. The first voltage value is a predetermined voltage value. The conditions (E) to (G) respectively correspond to the conditions (4) to (6) in the claims.

The unfreezing completion determination threshold values 293 include an unfreezing completion current value I3, an unfreezing completion cumulative value S1, an unfreezing completion exhaust amount Q1 and an unfreezing completion voltage value V2, as the threshold values used for the unfreezing completion determination. When the result of the unfreezable determination indicates that the frozen part of the fuel cell system 100 is unfreezable, the power controller 27 performs the unfreezing process to unfreeze the frozen part of the fuel cell system 100. Subsequently the determiner 26 performs the unfreezing completion determination to determine whether unfreezing of the frozen part of the fuel cell system 100 is completed. The determiner 26 determines that unfreezing of the frozen part of the fuel cell system 100 is completed by the unfreezing process when all the following conditions (H) to (J) are satisfied:

(H) The product of the current value of electric power generated by the fuel cell 10 and the time period of power generation by the fuel cell 10 is equal to or greater than the unfreezing completion cumulative value S1;

(I) The amount of exhaust from the fuel cell system 100 to the outside air by power generation of the fuel cell 10 is equal to or greater than the unfreezing completion exhaust amount Q1; and (J) The current value of electric power generated by the fuel cell 10 is equal to or greater than the unfreezing completion current value I3 or the voltage value of electric power generated by the fuel cell 10 is equal to or greater than the unfreezing completion voltage value V2.

Satisfaction of the condition (H) indicates that the anode is likely to be sufficiently filled with hydrogen. Satisfaction of the condition (I) indicates that the exhaust amount measured by the flow rate detector 45 is sufficient and that various valves including the exhaust valve 43 are unlikely to be frozen. Like satisfaction of the condition (H), satisfaction of the condition (J) indicates that the anode is likely to be sufficiently filled with hydrogen. When all the conditions (H) to (J) are satisfied, the determiner 26 accordingly determines that unfreezing of the frozen part of the fuel cell system 100 is completed by the unfreezing process. The unfreezing completion cumulative value S1 corresponds to the cumulative value in the claims. The unfreezing completion exhaust amount Q1 corresponds to the exhaust amount in the claims. The unfreezing completion current value I3 corresponds to the third current value in the claims. The unfreezing completion voltage value V2 corresponds to the second voltage value in the claims. The conditions (H) to (J) respectively correspond to the conditions (7) to (9) in the claims.

A-2. Shift-to-Ready State Process

Figure 3:
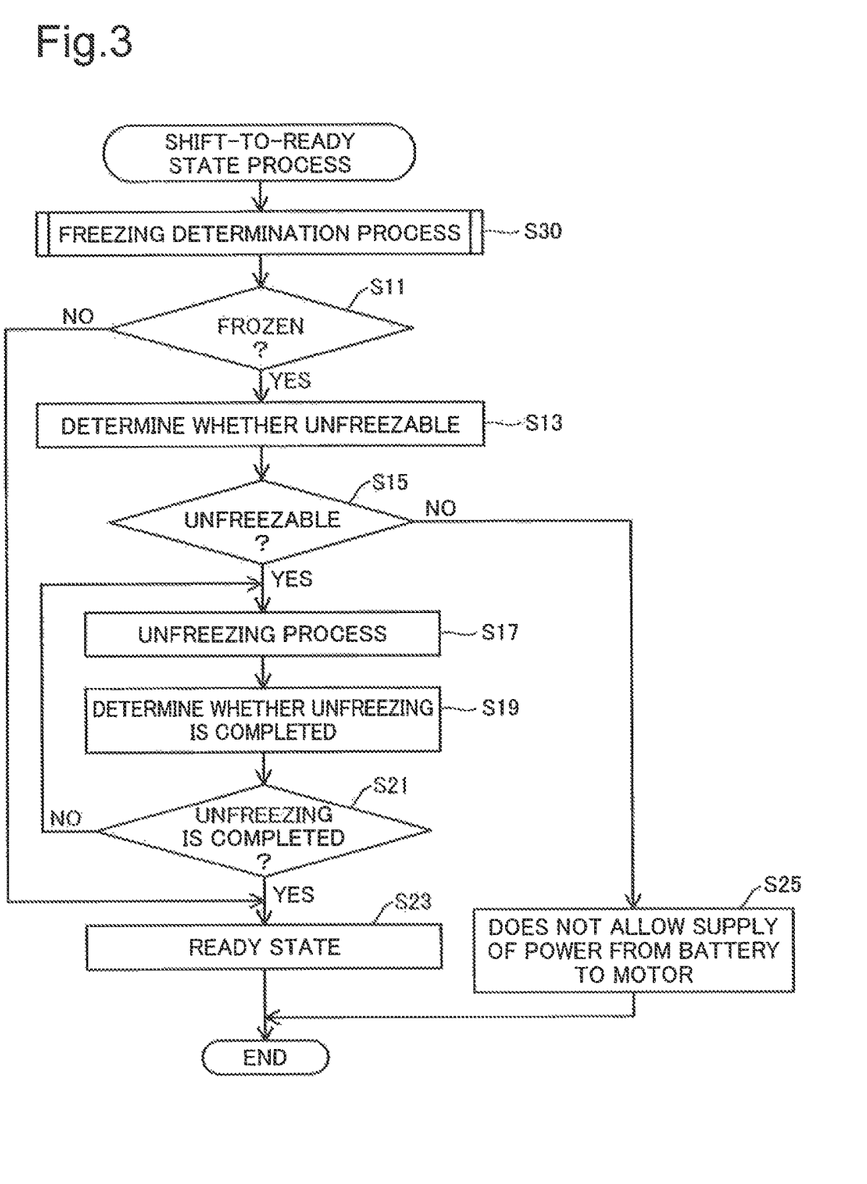
FIG. 3 is a flowchart showing a shift-to-ready state process according to the embodiment.

FIG. 3 is a flowchart showing a shift-to-ready state process according to the embodiment. The shift-to-ready state is performed by the controller 20 in the checking state when the vehicle 300 with the fuel cell system 100 mounted thereon is changed from the OFF state to the ON state. When it is determined that the fuel cell system 100 can be started, the shift-to-ready state process allows electric power to be supplied from the battery 80 to the motor 70 and thereby allows for a shift to the ready state. When the shift-to-ready state process is triggered, the determiner 26 first performs a freezing determination process to determine whether the fuel cell system 100 has any frozen part (step S30).

Figure 4:
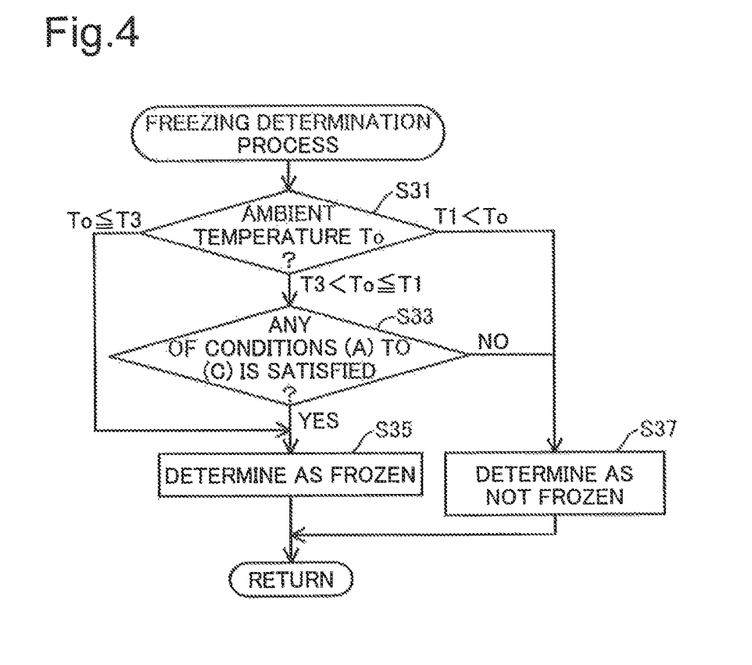
FIG. 4 is a flowchart showing a freezing determination process according to the embodiment.

FIG. 4 is a flowchart showing the freezing determination process. In the freezing determination process, the determiner 26 first checks the detection value TT of the temperature detector 56 (step S31). The freezing determination process follows different flows according to the detection value TT of the temperature detector 56 checked by the determiner 26. When the checking result indicates that the detection value TT of the temperature detector 56 is higher than the freezing temperature T3 and is equal to or lower than the freezing condition temperature T1 (step S31: T3<TT≤T1), the determiner 26 determines whether any of the conditions (A) to (C) described above is satisfied (step S33). When any of the conditions (A) to (C) is satisfied (step S33: YES), the determiner 26 determines that the fuel cell system 100 has a frozen part (step S35) and terminates the freezing determination process.

When the checking result of step S31 indicates that the detection value TT of the temperature detector PT is equal to or lower than the freezing temperature T3 (step S31: TT≤T3), the determiner 26 determines that the fuel cell system 100 has a frozen part (step S35) and terminates the freezing determination process. When the checking result of step S31 indicates that the detection value TT of the temperature detector 56 is higher than the freezing condition temperature T1 (step S31: T1<TT), the determiner 26 determines that the fuel cell system 100 has no frozen part (step S37) and terminates the freezing determination process.

When it is determined at step S33 that none of the conditions (A) to (C) is satisfied (step S33: NO), the determiner 26 determines that the fuel cell system 100 has no frozen part (step S37) and terminates the freezing determination process.

After completion of the freezing determination process shown in FIG. 4, the determiner 26 determines whether the fuel cell system 100 has a frozen part, based on the result of the freezing determination process (step S11). When it is determined that the fuel cell system 100 has a frozen part (step S11: YES), the determiner 26 performs the unfreezable determination to determine whether the frozen part is unfreezable (step S13). When any of the conditions (E) to (G) described above is satisfied in the unfreezable determination, the determiner 26 determines that the frozen part is not unfreezable. When the determiner 26 determines that the frozen part is not unfreezable (step S15: NO), the power controller 27 does not allow electric power to be supplied from the battery 80 to the motor 70 (step S25) and terminates the shift-to-ready state process.

When the determiner 26 determines at step S15 that the frozen part of the fuel cell system 100 is unfreezable (step S15: YES), on the other hand, the power controller 27 performs the unfreezing process to unfreeze the frozen part (step S17). The power controller 27 causes the fuel cell 10 to perform power generation as the unfreezing process. The determiner 26 subsequently performs the unfreezing completion determination to determine whether the frozen part is unfrozen (step S19). When all the conditions (H) to (J) described above are satisfied in the unfreezing completion determination, the determiner 26 determines that unfreezing of the frozen part is completed. When the determiner 26 determines that unfreezing of the frozen part is not yet completed (step S21: NO), the power controller 27 continues the freezing process (step S17). When the determiner 26 determines at step S21 that unfreezing of the frozen part is completed (step S21: YES), on the other hand, the power controller 27 allows electric power to be supplied from the battery 80 to the motor 70 and thereby allows for a shift to the ready state in which the vehicle 300 is made ready for driving (step S23) and terminates the shift-to-ready state process.

As described above, in the fuel cell system 100 of the embodiment, the determiner 26 determines that the fuel cell system 100 has no frozen part when none of the conditions (A) to (C) described above is satisfied at step S33 in the freezing determination process of FIG. 4. When the determiner 26 determines that the fuel cell system 100 has no frozen part, the power controller 27 allows electric power to be supplied from the fuel cell 10 or the battery 80 to the motor 70 and allows for a shift to the ready state in which the vehicle 300 is made ready for driving. When the determiner 26 determines that the fuel cell system 100 has a frozen part, on the other hand, the determiner 26 performs the unfreezable determination. In response to a control command for changing from the OFF state to the ON state, the fuel cell system 100 of the embodiment first determines whether the fuel cell system 100 has a frozen part, without driving the motor 70. When it is determined that the fuel cell system 100 has a frozen part, the fuel cell system 100 does not allow the motor 70 to be driven. This configuration prevents a failure to start the fuel cell system 100 and a resulting shortage of electric power supplied to the motor 70 due to reduction in state of charge of the battery 80, after the motor 70 is driven to start the vehicle 300.

In the fuel cell system 100 of the embodiment, the determiner 26 determines whether the detection value TT of the temperature detector 56 is equal to or lower than the freezing temperature T3, before determining whether any of the conditions (A) to (C) is satisfied at step S33 in the freezing determination process of FIG. 4. When the detection value TT of the temperature detector 56 is equal to or lower than the freezing temperature T3, the determiner 26 determines that the fuel cell system 100 has a frozen part. As described above, when the detection temperature TT of the temperature detector 56 is equal to or lower than a certain temperature, the fuel cell system 100 of the embodiment determines that the fuel cell system 100 has a frozen part without checking the record of, for example, the PP process. This configuration more effectively prevents a failure to start the fuel cell system 10.

In the fuel cell system 100 of the embodiment, when any of the conditions (E) to (G) is satisfied after determination that the fuel cell system 100 has a frozen part, the determiner 26 determines that the frozen part of the fuel cell system 100 is not unfreezable. On determination that the frozen part is not unfreezable, the power controller 27 does not allow electric power to be supplied from the battery 80 to the motor 70. As described above, when the frozen part of the fuel cell system 100 is not unfreezable, the fuel cell system 100 of the embodiment does not allow the motor 70 to be driven. This configuration prevents a failure to start the fuel cell system 100 and a resulting shortage of electric power supplied to the motor 70 due to reduction in state of charge of the battery 80, after the motor 70 is driven to start the vehicle 300.

In the fuel cell system 100 of the embodiment, when the result of the unfreezable determination indicates that the frozen part is unfreezable, the power controller 27 performs at least one of the power generation of the fuel cell 10 and the operation of the auxiliary machinery by the supply of electric power from the battery 80 as the unfreezing process. As described above, when the fuel cell system 100 has any unfreezable frozen part, the fuel cell system 100 of the embodiment performs the unfreezing process. This configuration ensures a quick start of the fuel cell system 100.

In the fuel cell system 100 of the embodiment, when all the conditions (H) to (J) are satisfied in the course of the unfreezing process, the determiner 26 determines that the frozen part of the fuel cell system 100 is unfrozen. When it is determined that the frozen part is unfrozen, the power controller 27 shifts the state of the vehicle 300 to the ready state in which the motor 70 is drivable by supplying electric power from the battery 80. The fuel cell system 100 of the embodiment shifts the state of the vehicle 300 to the ready state after the frozen part of the fuel cell system 100 is unfrozen by the unfreezing process. This configuration prevents a failure to start the fuel cell system 100 during driving of the vehicle 300, and additionally allows the vehicle 300 to continue driving by starting the fuel cell system 100 to drive the motor 70 with electric power generated by the fuel cell 10.

B. Modifications

The invention is not limited to any of the embodiments and the examples described above but may be implemented by a diversity of other configurations without departing from the scope of the invention. Some examples of possible modification are given below.

B-1. Modification 1

In the embodiment described above, the determiner 26 performs the freezing determination to determine whether any of the conditions (A) to (C) is satisfied when the result of the freezing determination with regard to the condition (D) indicates that the fuel cell system 100 has no frozen part. The sequence of the freezing determination may be changed appropriately. For example, the determiner 26 may perform the freezing determination to determine whether any of the conditions (A) to (C) is satisfied without performing the freezing determination with regard to the condition (D). According to a modification, the determiner 26 may not perform the unfreezable determination or the unfreezing completion determination after the freezing determination. In this modification, the power controller 27 may supply electric power from the fuel cell 10 or the battery 80 to the motor 70, based on only the result of the freezing determination with regard to the conditions (A) to (C) by the determiner 26. According to another modification, the power controller 27 may not necessarily perform the unfreezing process. When it is determined that the frozen part is unfreezable, the power controller 27 may unfreeze the frozen part by performing warm-up control that causes the fuel cell 10 to generate electric power, while the vehicle 300 is driven with rotation of the motor 70 by electric power supplied from the battery 80.

Figure 5:
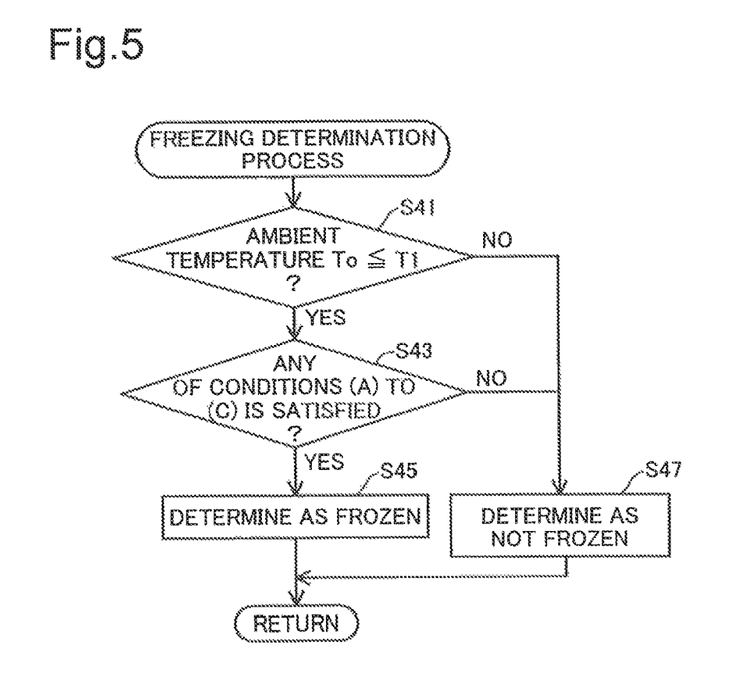
FIG. 5 is a flowchart showing a freezing determination process according to a modification.

FIG. 5 is a flowchart showing a freezing determination process according to a modification. The freezing determination process of the modification differs from the freezing determination process shown in FIG. 4 by only the processing flow involved in step S41. Otherwise the freezing determination process of the modification is similar to the freezing determination process of FIG. 4, and description of the similar part is omitted. In the freezing determination process of the modification shown in FIG. 5, the determiner 26 does not use the freezing temperature T3 but determines the subsequent processing flow according to the magnitude relationship between the freezing condition temperature T1 and the detection value TT of the temperature detector 56. More specifically, at step S41, the determiner 26 determines whether the detection value TT of the temperature detector 56 is equal to or lower than the freezing condition temperature T1. When it is determined that the detection value TT of the temperature detector 56 is equal to or lower than the freezing condition temperature T1 (step S41: YES), the determiner 26 performs the processing of and after step S43. When it is determined that the detection value TT of the temperature detector 56 is higher than the freezing condition temperature T1 (step S41: NO), on the other hand, the determiner 26 determines that the fuel cell system 100 has no frozen part (step S47).

In the above embodiment, the condition (A) having no record of the purging process and the condition (B) having no record of the PP process may be replaced by a condition having a record of detachment of the battery 80 of the fuel cell system 100 in the OFF state of the vehicle 300. Detachment of the battery 80 in the fuel cell system 100 means that there is no power source for the purging process and the PP process. Neither the purging process nor the PP process can thus be performed in the OFF state of the vehicle 300. Accordingly the condition having a record of detachment of the battery 80 in the OFF state can be regarded as the condition (A) having no record of the purging process and the condition (B) having no record of the PP process.

B-2. Modification 2

In the above embodiment, the determiner 26 performs the unfreezable determination when it is determined that the fuel cell system 100 has a frozen part. The unfreezable determination may not be necessarily performed. According to a modification, when the determiner 26 determines that the fuel cell system 100 has a frozen part, the power controller 27 may not necessarily allow electric power to be supplied to the motor 70, based on the determination. In this modification, the fuel cell system 100 may not allow electric power to be supplied from the battery 80 to the motor 70 by taking into account the possibility of a failure to start the fuel cell system 100 due to the presence of a frozen part in the fuel cell system 100. This modified configuration prevents a shortage of electric power supplied from the battery 80 to the motor 70 during driving of the vehicle 300.

In the above embodiment, the determiner 26 performs the freezing determination using the freezing determination threshold values 291. The freezing determination may not be necessarily performed with regard to all the conditions (A) to (D). For example, the determiner 26 may perform the freezing determination with regard to only the condition (A) and may determine whether the fuel cell system 100 has a frozen part without performing the freezing determination with regard to the conditions (B) to (D). Similarly, the determiner 26 may not necessarily perform the unfreezable determination with regard to all the conditions (E) to (G). For example, the determiner 26 may perform the unfreezable determination with regard to the conditions (E) and (F) and may determine whether the frozen part is unfreezable without performing the unfreezable determination with regard to the condition (G). The determiner 26 may also not necessarily perform the unfreezing completion determination with regard to all the conditions (H) to (J). For example, the determiner 26 may perform the unfreezing completion determination with regard to only the condition (J) and may determine whether the frozen part is unfrozen without performing the unfreezing completion determination with regard to the conditions (H) and (I).

At least a portion of the functions and processes realized using software with the embodiments noted above may also be realized using hardware. Also, at least a portion of the functions and processes realized using hardware may be realized using software. As hardware, for example, it may be to use various types of circuits (circuitry), such as integrated circuits, discrete circuits, or circuit modules combining those circuits, for example.

The invention is not limited to any of the embodiments, the examples and the modifications described above but may be implemented by a diversity of other configurations without departing from the scope of the invention. For example, the technical features of any of the embodiments, the examples and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A vehicle, comprising:
a fuel cell system that has a fuel cell and a gas flow path arranged to supply a reactive gas to the fuel cell and is configured to allow the fuel cell to generate electric power by controlling supply of the reactive gas to the fuel cell;
a battery that is configured to store electric power;
a motor that is operated by receiving supply of electric power from at least one of the fuel cell and the battery;
a temperature measurement unit that is configured to measure temperature in the fuel cell system; and
a controller that includes a determiner configured to determine that the fuel cell system has a frozen part when the temperature measured by the temperature measurement unit is equal to or lower than a predetermined first temperature and at least one of conditions (1) to (3) is satisfied at a time of change from an off state of the vehicle in which power supply of the vehicle is off to an on state of the vehicle in which power supply of the vehicle is on, and a power controller configured to control an amount of electric power that is to be supplied to the motor:
  (1) a purging process of supplying a purge gas to the gas flow path is not performed after the change from the on state of the vehicle to the off state of the vehicle;
  (2) the temperature measured by the temperature measurement unit decreases to or below a predetermined second temperature in the off state of the vehicle and the purging process of supplying the purge gas to the gas flow path is not performed; and
  (3) an inclination of the vehicle is equal to or greater than a predetermined inclination at the time of change from the off state of the vehicle to the on state of the vehicle, wherein
when the determiner determines that the fuel cell system has no frozen part, the power controller allows electric power to be supplied from at least one of the fuel cell and the battery to the motor.

2. The vehicle according to claim 1,
wherein when the temperature measured by the temperature measurement unit is higher than a predetermined third temperature that is lower than the predetermined first temperature at the time of change from the off state of the vehicle to the on state of the vehicle, the determiner determines whether at least one of the conditions (1) to (3) is satisfied, and
when the temperature measured by the temperature measurement unit is equal to or lower than the predetermined third temperature at the time of change from the off state of the vehicle to the on state of the vehicle, the determiner determines that the fuel cell system has a frozen part without determining whether any one of the conditions (1) to (3) is satisfied.

3. The vehicle according to claim 1,
wherein when at least one of conditions (4) to (6) is satisfied after determination that the fuel cell system has a frozen part, the determiner determines that the frozen part of the fuel cell system is not unfreezable:

(4) electric power is supplied from the battery to an auxiliary machine provided to start the fuel cell system, and a suppliable electric power stored in the battery is reduced;

(5) a state that a current value of electric power generated by the fuel cell is equal to or lower than a predetermined first current value continues for a predetermined time period or a longer time period; and (6) the current value of electric power generated by the fuel cell is equal to or lower than a predetermined second current value or when a voltage value of electric power generated by the fuel cell is equal to or lower than a predetermined first voltage value, wherein when the determiner determines that the frozen part is not unfreezable, the power controller does not allow electric power to be supplied from the battery to the motor.

4. The vehicle according to claim 3, wherein when the determiner determines that the frozen part is unfreezable, the power controller performs an unfreezing process that unfreezes the frozen part of the fuel cell system by at least one of operation of the auxiliary machine provided to start the fuel cell system with electric power supplied from the battery and power generation of the fuel cell.

5. The vehicle according to claim 4, wherein when the power controller performs the unfreezing process and all of conditions (7) to (9) are satisfied, the determiner determines that the fuel cell system has no frozen part and is in an unfrozen state:

(7) a cumulative current value of electric power generated by the fuel cell is equal to or greater than a predetermined cumulative value;

(8) an exhaust amount in the fuel cell system is equal to or greater than a predetermined exhaust amount; and (9) the current value of electric power generated by the fuel cell is equal to or higher than a predetermined third current value or the voltage value of electric power generated by the fuel cell is equal to or higher than a predetermined second voltage value, wherein when the determiner determines that the fuel cell system is in the unfrozen state, the power controller allows electric power to be supplied from at least one of the fuel cell and the battery to the motor.

* * * * *